United States Patent [19]
Parsons

[11] Patent Number: 5,979,128
[45] Date of Patent: Nov. 9, 1999

[54] WIND SHELTER AND METHOD OF INSTALLATION

[76] Inventor: Jack L. Parsons, 987 Quayle Dr., DeLand, Fla. 32724

[21] Appl. No.: 09/126,052

[22] Filed: Jul. 30, 1998

[51] Int. Cl.⁶ ..................................................... E04H 9/14
[52] U.S. Cl. .............................. 52/169.6; 52/19; 52/79.1; 52/741.11; 52/745.2
[58] Field of Search ................................. 52/169.6, 169.7, 52/19, 79.1, 745.2, 745.21, 741.11

[56] References Cited

U.S. PATENT DOCUMENTS

| | | |
|---|---|---|
| 4,539,780 | 9/1985 | Rice . |
| 4,615,158 | 10/1986 | Thornton . |
| 4,955,166 | 9/1990 | Qualline et al. . |
| 5,048,244 | 9/1991 | Barbier . |
| 5,481,837 | 1/1996 | Minks, Jr. . |
| 5,542,780 | 8/1996 | Kourgli . |
| 5,611,178 | 3/1997 | Aubert . |
| 5,791,098 | 8/1998 | Thomas ................................... 52/169.6 |

*Primary Examiner*—Christopher T. Kent
*Attorney, Agent, or Firm*—Paul S. Rooy

[57] ABSTRACT

A wind shelter and method of installation. The wind shelter comprises a slab having a slab aperture, a pit in underlying solid material, a liner disposed within the slab aperture and pit, and a cover, the liner and cover being securely attached to the slab. The cover has at least one door and meshed windows, and is built to resemble and function as a table. The method of installation includes the steps of cutting a slab aperture in the slab, excavating a pit in the underlying material, securing installation walls against the pit walls, positioning the liner within the pit and the cover over the liner, and securely fastening the liner and cover to the slab. The slab may be the floor of a mobile home extension structure such as a porch, utility building, Florida room, driveway, sidewalk, etc.

16 Claims, 3 Drawing Sheets

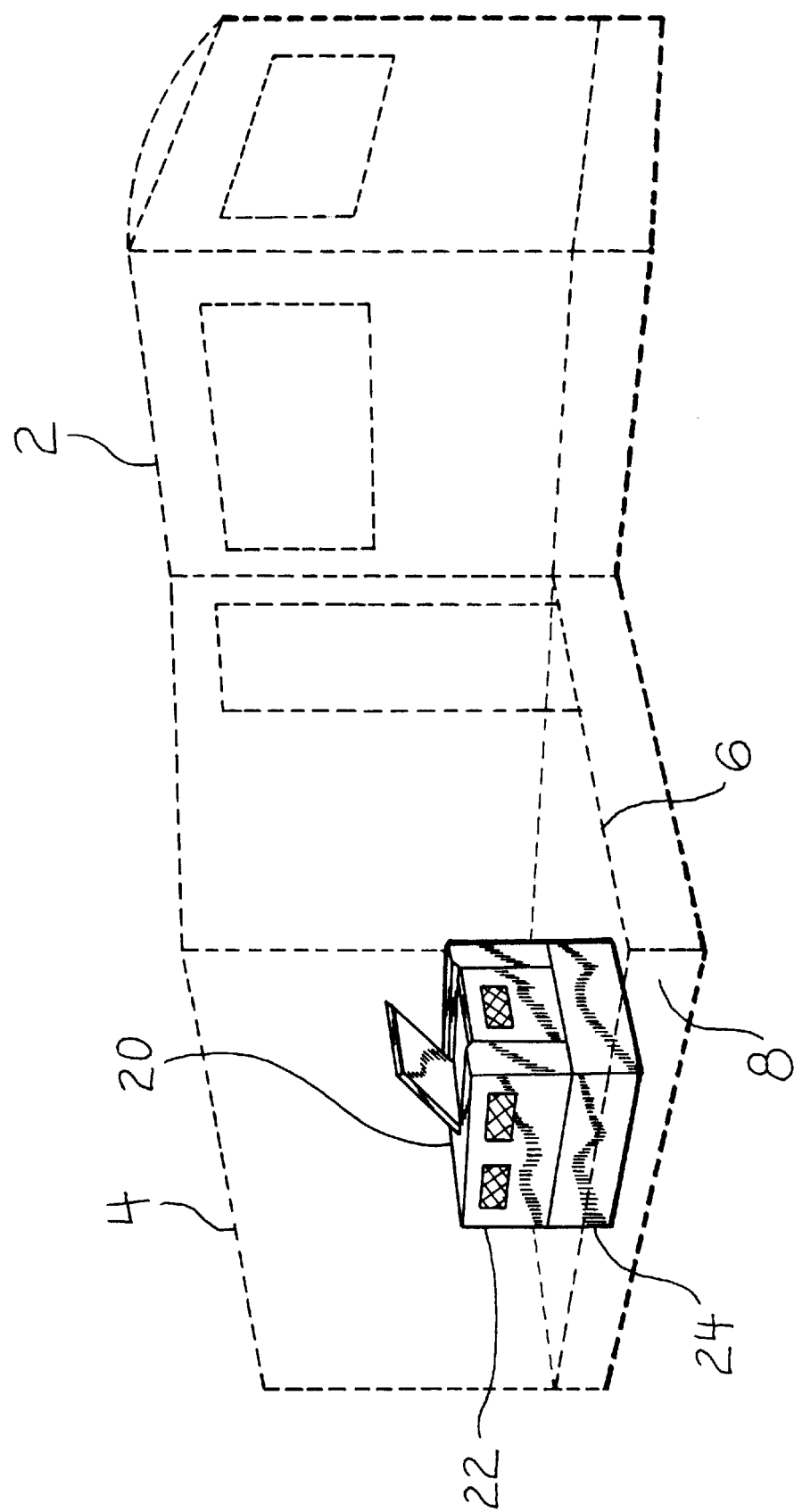

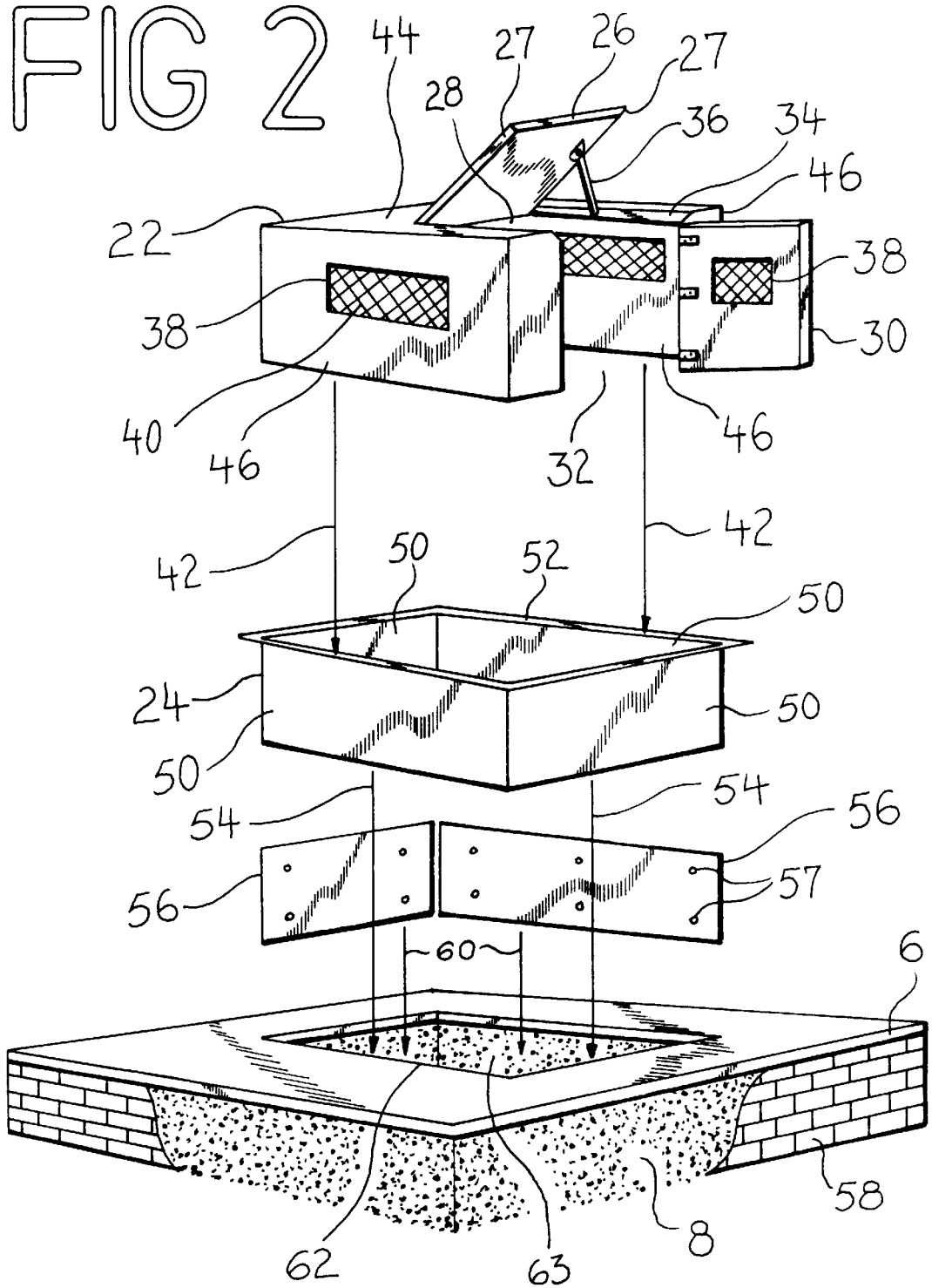

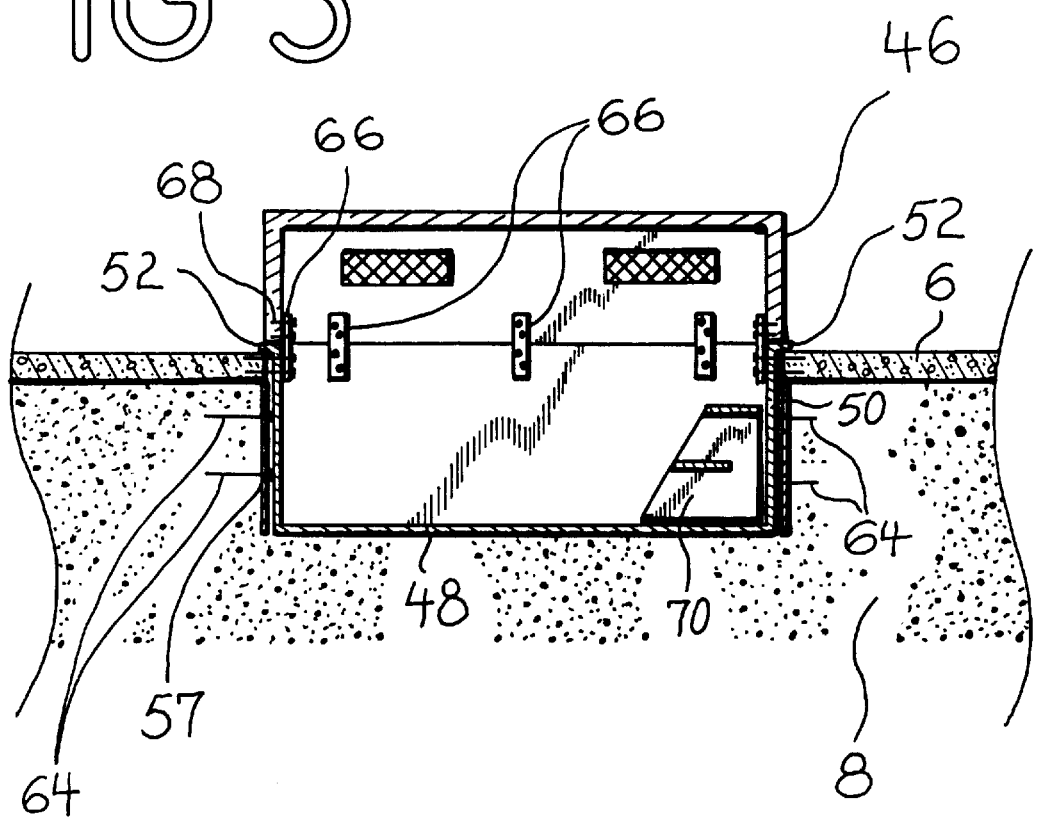

WIND SHELTER AND METHOD OF INSTALLATION

BACKGROUND OF THE INVENTION

1. Field of the Invention

This invention relates to wind shelters, and in particular to a semi-subterranean wind shelter attached to a concrete slab.

2. Background of the Invention

Mobile, or pre-manufactured, homes are one of the building designs most susceptible to wind damage. The multitude of damaged and destroyed mobile homes left in the wake of the recent hurricane Andrew in Florida, as well as the numerous tornado mobile home casualties all across the rest of the country, bear mute testimony to this fact.

The safety problems for humans associated with mobile home susceptibility to wind damage are exacerbated by the lack of a cellar. Most mobile homes do not have an underground cellar which could serve as refuge for the occupants. The idea behind seeking shelter from high winds in subterranean shelters is the wind will tend to blow over the shelter, and the occupants will thus be better protected from harm. In the Midwest it is common practice to build cellars into houses, and use same as storm shelters in the presence of high winds, such as occur with tornadoes. Mobile homes, on the other hand, are generally towed into position and tied down, and no cellar is built.

One solution to the high-wind safety hazard associated with mobile homes is to install a storm cellar for the mobile home occupants to go to when threatened by hurricanes or tornadoes. One complicating factor in installing such storm cellars is lack of physical lot space within which to make the installation. Many mobile home parks provide a relatively small lot for each mobile home. Thus it would be desirable to provide a wind shelter installable within the existing footprint of a mobile home.

Existing Designs

A number of designs have been suggested for wind shelters. U.S. Pat. Nos. 4,539,780, 4,955,166 and 5,048,244 were granted Rice, Qualline et al. and Barbier respectively for subterranean shelters. While these designs provided an underground refuge, they were complex, and hence expensive to build and install. In addition, they required installation space separate from existing structures, and thus required additional space which might not be available in many mobile home parks.

Thornton was granted U.S. Pat. No. 4,615,158 for a mobile home tornado shelter for installation outside an existing mobile home. This design required installation space separate from existing structures, and thus demanded additional space which might not be available in many mobile home parks. In addition, no provision was made to anchor the shelter to a solid existing structure such as a cement slab.

U.S. Pat. No. 5,481,837 was granted Minks, Jr. for a storm shelter for use with a mobile home. This patent disclosed a storm shelter which could be integrated into a mobile home porch, and thus provided the possibility that the shelter could be built within the existing mobile home footprint, at least in those mobile homes which had a porch. The '837 design also taught a floor which could be mechanically anchored to soil in which the shelter was installed, by means of a perimetral lip around the floor. While this design provided some anchoring, the anchoring was not as effective as if the shelter had been anchored to a solid structure, such as a concrete slab. In addition, this design was not pre-fabricated. Consequently, the '837 shelter had to be assembled on site, thus increasing installation costs. Finally, no method to prevent earth cave-in at the excavation site during the installation process was taught.

SUMMARY OF THE INVENTION

Accordingly, it is an object of the present invention to provide a wind shelter which is extremely wind-resistant. Design features allowing this object to be accomplished include a subterranean liner and a cover attached to a concrete slab. Advantages associated with the accomplishment of this object include increased safety to shelter occupants, as well as decreased mental stress, thanks to the shelter's existence.

It is another object of the present invention to provide a wind shelter which may be installed within the existing footprint of a dwelling. Design features allowing this object to be accomplished include a slab aperture sized to admit a liner, and a cover manufactured to resemble a table. Benefits associated with the accomplishment of this object include the ability to find room to install the wind shelter, and consequent increased occupant safety and peace of mind.

It is another object of the present invention to provide a wind shelter which may be installed in already existing structures such as a porch, screen room, pool deck, utility building or other extension room, Florida room, etc. Design features allowing this object to be accomplished include a slab aperture cut into the existing structure's floor, and a pit dug underneath the slab aperture sized to admit a liner, and a cover, both the liner and the cover being securely attached to the existing slab at the slab aperture. Benefits associated with the accomplishment of this object include the flexibility to install the wind shelter almost anywhere within existing building structure, thus dramatically increasing availability and affordability of the wind shelter, along with consequent increased occupant safety and peace of mind.

It is still another object of this invention to provide a wind shelter whose cover resembles a high quality table. Design features enabling the accomplishment of this object include a cover top attached to four cover sides, and a flush-fitting top door. An advantage associated with the realization of this object is enhanced aesthetic appearance of the wind shelter.

It is another object of the present invention to provide a wind shelter with good ventilation and outside views. Design features allowing this object to be accomplished include a plurality of meshed windows. Benefits associated with the accomplishment of this object include enhanced occupant comfort through the supply of fresh air, and the ability of occupants to see out and gauge when it is safe to exit the wind shelter.

It is still another object of this invention to provide a method of installing a wind shelter which is simple and economical. Design features enabling the accomplishment of this object include a plurality of installation walls, and a prefabricated cover and liner. Advantages associated with the realization of this object include faster installation, with associated cost savings.

It is yet another object of this invention to provide a wind shelter which is inexpensive to fabricate and install. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIG. 1. Sheet two contains FIG. 2. Sheet three contains FIG. 3.

FIG. 1 is a front quarter isometric view of a wind shelter installed in a mobile home porch.

FIG. 2 is an exploded view of a wind shelter in the process of being installed in a mobile home porch.

FIG. 3 is a side cross-sectional view of a wind shelter installed in a slab.

DETAILED DESCRIPTION OF THE PREFERRED EMBODIMENT

FIG. 1 is a front quarter isometric view of wind shelter 20 installed in mobile home porch 4. Mobile home 2 has porch 4 attached to it. Porch 4 is comprised of slab 6 residing atop solid material 8. Solid material 8 is generally earth, fill dirt, gravel, etc. FIGS. 1 and 2 illustrate a built-up porch whose fill material is constrained by porch base wall 58, but wind shelter 20 may also be installed in a slab 6 which is flush with the surface.

Mobile homes 2 are customarily mounted on blocks or bricks, and thus the floor of porch 4 is frequently elevated in order to bring it to the same level as the floor of mobile home 2. Another manner of installing porch 4 is to place slab 6 directly on ground level, and to supply stairs for occupants of mobile home 2 to descend to the level of slab 6.

Referring now also to FIG. 2, wind shelter 20 comprises cover 22 attached to liner 24. Liner 24 is installed through slab aperture 62 and into pit 63 excavated in solid material 8, and is thus entirely subterranean. Cover 22 is installed atop liner 24, and both cover 22 and liner 24 are securely attached to slab 6. Slab 6 may be made of concrete, cement, synthetic, or other appropriate material.

FIG. 2 is an exploded view of wind shelter 20 in the process of being installed in mobile home porch 4. The first step is to cut slab aperture 62 in slab 6, and then dig pit 63. Installation walls 56 sized to match the size of liner sides 50 are then immediately placed within pit 63 as indicated by arrows 60, just below slab 6, in order to prevent solid material 8 cave-ins in pit 63, and to prevent liner 24 from scraping solid material 8 from the walls of pit 63 during installation. As may be observed in FIG. 3, installation walls 56 are held in place by means of spikes 64 installed through bores 57 into solid material 8. Slab 6 may be the floor of an existing building structure such as a porch, screen room, pool deck, utility building or other extension room, Florida room, driveway, sidewalk, etc.

Next, liner 24 is inserted through slab aperture 62 into pit 63 as indicated by arrows 54. Pit 63 is lined with installation walls 56. Slab aperture 62 is sized to admit liner sides 50, but not liner flange 52. Thus, when installed, liner floor 48 rests on solid material 8, liner flange 52 rests on slab 6, and installation walls 56 are sandwiched between liner sides 50 and solid material 8.

The next step is to place cover 22 over liner flange 52 as indicated by arrows 42. Referring now also to FIG. 3, straps 66 are then attached to cover sides 46, liner sides 50, and slab 6 by means of fasteners 68. Note that when installed, liner walls 50 are sandwiched between slab 6 and a plurality of straps 66. In this fashion, both cover 22 and liner 24 are securely fastened to slab 6, thus creating an extremely strong and wind-resistant installation. In the preferred embodiment, liner 24 was fastened to slab 6 by means of concrete or cement fasteners, and to cover sides 46 by means of wood screws.

Entry and exit may be effectuated by means of top door 26 and side door 30. Cover 22 is comprised of a plurality of cover sides 46 rigidly attached to cover top 44. One cover side 46 comprises side door 30, which is hingedly attached to the cover side 46, and when closed, is disposed within side door aperture 32. Cover top 44 comprises top door 26, which is hingedly attached to the cover top 44, and when closed, is disposed within top door aperture 28. Top door aperture 28 and top door 26 may be beveled with mating top door aperture bevel 34 and top door bevel 27 respectively, whereby the closed fit of top door 26 into top door aperture 28 is rendered tight, precise and flush, thus contributing to the finely-finished table-top appearance of cover top 44.

Top door aperture 28 communicates with side door aperture 32, thus in combination creating an ample entry/exit hatch when top door 26 and side door 30 are open. Top door 26 may be held open by means of top door prop 36. Stairs 70 facilitate entry and exit. Handrails may be provided to enhance safety, and various items such as chairs, a table, provisions, etc., may be placed within wind shelter 20 for use by its occupants.

Cover sides 46 comprise windows 38 containing window mesh 40. Windows 40 provide ventilation and visibility for the occupants of wind shelter 20.

In the preferred embodiment, cover 22 was made of 1½ inch thick wood or other appropriate material, and liner 24 was made of galvanized steel approximately 3/32 inch thick, or other appropriate material. The corners of cover 22 were internally braced to increase the structural strength of wind shelter 20.

While a preferred embodiment of the invention has been illustrated herein, it is to be understood that changes and variations may be made by those skilled in the art without departing from the spirit of the appending claims.

DRAWING ITEM INDEX 2 mobile home
4 porch
6 slab
8 solid material
20 wind shelter
22 cover
24 liner
26 top door
27 top door bevel
28 top door aperture
30 side door
32 side door aperture
34 top door aperture bevel
36 top door prop
38 window
40 window mesh
42 arrow
44 cover top
46 cover side
48 liner floor
50 liner side
52 liner flange
54 arrow
56 installation wall
57 bore
58 porch base wall
60 arrow
62 slab aperture
63 pit
64 spike 66 strap
68 fastener
70 stairs

I claim:

1. A wind shelter comprising a cover rigidly attached to a liner, and a slab comprising a slab aperture sized to admit said liner, said cover and said liner being securely attached to said slab at said slab aperture, whereby said wind shelter is rendered extremely stable in the presence of s strong wind.

2. The wind shelter of claim 1 wherein said liner comprises a plurality of liner sides rigidly attached to a liner floor, and said cover comprises a plurality of cover sides rigidly attached to a cover top, one said cover side comprising a side door closing into a side door aperture, said cover top comprising a top door closing into a top door aperture, said side door aperture communicating with said top door aperture, whereby occupants may enter and exit said wind shelter.

3. The wind shelter of claim 2 wherein said slab resides atop solid material, and said wind shelter further comprises a pit excavated in said solid material, said pit being sized to admit said liner, said liner being disposed within said pit and said slab aperture.

4. The wind shelter of claim 3 wherein said liner comprises a liner flange disposed along edges of said liner sides opposite said liner floor, said liner flange being sized to exceed an area of said slab aperture, whereby said liner flange securely holds said liner flush with an upper surface of said slab.

5. The wind shelter of claim 4 wherein said cover sides comprise windows whereby occupants of said wind shelter may be provided with ventilation and a view to an outside of said wind shelter.

6. The wind shelter of claim 5 wherein said windows comprise window mesh, whereby occupants of said wind shelter may be protected from airborne debris.

7. The wind shelter of claim 5 wherein said liner and said cover are securely attached to said slab by means of fasteners and straps, a first extreme of each said strap being attached to said cover by means of at least one said fastener, a second extreme of each said strap being attached to said slab by means of at least one said fastener passing through the second strap extreme and through said liner, and anchoring in said slab.

8. The wind shelter of claim 7 wherein said top door aperture and said top door are beveled with mating top door aperture bevels and top door bevels respectively, whereby the closed fit of said top door into said top door aperture is rendered tight, precise and flush, thus contributing to a finely-finished table-top appearance of said cover top.

9. The wind shelter of claim 8 wherein said top door may be held open by means of a top door prop.

10. A method of installing a wind shelter comprising the steps of:

A. Providing a slab disposed over underlying solid material, and a wind shelter, said wind shelter comprising a cover and a liner, said liner comprising a plurality of liner sides rigidly attached to a liner floor, a liner flange disposed along edges of said liner sides opposite said liner floor, and means of securely attaching said liner and said cover to said slab;

B. Cutting a slab aperture in said slab sized to admit said liner but not said liner flange;

C. Excavating a pit in said underlying solid material sized to admit said liner, a mouth of said pit being co-extensive with said slab aperture;

D. Positioning installation walls against walls of said pit and securing said installation walls in place by means of spikes passing through installation wall bores into said underlying solid material, whereby cave-ins of said pit walls are prevented;

E. Inserting said liner through said slab aperture into said installation wall-lined pit until said liner flange buts up against an upper surface of said slab;

F. Positioning said cover atop said liner flange; and

G. Securely attaching said liner and said cover to said slab.

11. The method of claim 10 wherein the means of securely attaching said liner and said cover to said slab comprises fasteners and straps, a first extreme of each said strap being attached to said cover by means of at least one said fastener, a second extreme of each said strap being attached to said slab by means of at least one said fastener passing through the second strap extreme and through said liner, and anchoring in said slab.

12. The method of claim 11 wherein said each said first strap extreme is attached to said cover by means of at least one wood screw, and each said second strap extreme is attached to said slab by means of at least one cement fastener.

13. A wind shelter for use with a mobile home comprising a mobile home extension structure having a slab floor residing atop underlying solid material, a liner comprising a liner flange, and a cover, a slab aperture through said slab, and a pit excavated into said underlying solid material, said liner being disposed within said slab aperture and said pit, said liner flange butting against an upper surface of said slab, said cover being disposed atop said liner, said liner and said cover being securely attached to said slab.

14. The wind shelter of claim 13 wherein said liner comprises a plurality of liner sides rigidly attached to a liner floor, and said cover comprises a plurality of cover sides rigidly attached to a cover top, one said cover sides comprising a side door closing into a side door aperture, said cover top comprising a top door closing into a top door aperture, said side door aperture communicating with said top door aperture, whereby occupants may enter and exit said wind shelter.

15. The wind shelter of claim 14 wherein said liner and said cover are securely attached to said slab by means of fasteners and straps, a first extreme of each said strap being attached to said cover by means of at least one said fastener, a second extreme of each said strap being attached to said slab by means of at least one said fastener passing through the second strap extreme and through said liner, and anchoring in said slab.

16. The wind shelter of claim 15 wherein said top door aperture and said top door are beveled with mating top door aperture bevels and top door bevels respectively, whereby the closed fit of said top door into said top door aperture is rendered tight, precise and flush, thus contributing to a finely-finished table-top appearance of said cover top.

* * * * *